(12) United States Patent
Amatucci

(10) Patent No.: US 6,198,623 B1
(45) Date of Patent: Mar. 6, 2001

(54) CARBON FABRIC SUPERCAPACITOR STRUCTURE

(75) Inventor: Glenn G. Amatucci, East Brunswick, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/240,903

(22) Filed: Jan. 29, 1999

(51) Int. Cl.⁷ ........................................................ H01G 9/02
(52) U.S. Cl. ............................ 361/512; 361/530; 361/511
(58) Field of Search .................. 361/502, 512, 361/504, 511, 530; 429/247, 249, 49

(56) References Cited

U.S. PATENT DOCUMENTS

| | | | |
|---|---|---|---|
| 4,616,290 | * 10/1986 | Watanabe et al. | 361/328 |
| 5,635,138 | * 6/1997 | Amatucci et al. | 422/104 |
| 5,859,761 | * 1/1999 | Aoki et al. | 361/502 |
| 5,922,492 | * 7/1999 | Takita et al. | 429/249 |
| 5,972,531 | * 10/1999 | Kawakami | 429/49 |

* cited by examiner

Primary Examiner—Anthony Dinkins
(74) Attorney, Agent, or Firm—David A. Hey

(57) ABSTRACT

Supercapacitor cell electrode (13, 17) and separator (15) elements are fabricated from activated carbon fabric and membranes of microporous fibrillar ultra-high molecular weight polyethylene and are laminated with electrically conductive current collector elements (11, 19) to form a flexible, unitary supercapacitor structure (10). The microfibrillar laminar structure of the separator membrane material enables direct application of cell lamination temperatures without resulting collapse of separator microporosity and attendant loss of essential electrolyte retention and ionic conductivity. The superior functional materials enable the fabrication of flexible, self-supporting cell structures which yield improved specific energy capacity and increased voltage output for utilization demands.

5 Claims, 2 Drawing Sheets

CARBON FABRIC SUPERCAPACITOR STRUCTURE

BACKGROUND OF THE INVENTION

The present invention relates to capacitors which are capable of exhibiting high-energy capacitance and high current density discharge over extended time periods ranging from a few seconds to minutes. Such "supercapacitors" are particularly useful for delivering high levels of electrical current to utilization devices in a much shorter time than required by battery systems alone. The invention is directed in particular to a supercapacitor structure, and method of making the same, which incorporates activated carbon fabric electrode elements in a unitary, flexible structure which may be sized and shaped as desired to be most compatible with utilization devices while providing advantageously high energy capacities and current densities.

In large measure, available supercapacitors are of the double layer type in which a pair of electrodes, typically comprising particulate activated carbon, are separated by a microporous, electron-insulating, ion-conducting sheet element comprising a uniformly-dispersed electrolyte component. The structure of the typical supercapacitor further comprises electrically-conductive current collector elements in intimate contact with the respective electrodes. Common among the structural variants of such prior supercapacitor devices are means, such as compressive arrangements, which maintain the essential close physical contact between elements in order to ensure low internal electrical resistance. An example of a capacitor of this type may be seen in U.S. Pat. No. 3,536,936 where the considerable compacting pressure required to reduce to usable levels the internal electrical resistance of a carbon particle electrode composition, as well as such resistance at the electrode/collector interface, creates severe difficulties in the fabrication of the capacitor cell.

Attempts have been made to reduce the internal electrical resistance in supercapacitor electrodes by means other than directly-applied physical pressure, notably through some manner of unifying the particulate carbon electrode composition and conductive collectors. A process of high-temperature sintering of the elements to achieve this end is described in U.S. Pat. No. 5,115,378, yet, as is apparent there, the extensive processing steps and high energy consumption lead to economic undesirability of this approach. Further limiting the general acceptance of the process is the intractability of the resulting solid and unyielding preformed capacitor body which cannot be readily shaped to conform to spacial requirements of varying utilization devices.

Other approaches to minimizing the internal resistance of supercapacitor structures have, for example, attempted to combine pyrolyzed aerogel carbon foam electrodes with high-temperature soldering of conductive collector elements, as described in U.S. Pat. No. 5,260,855. Such approaches have realized limited success, however, due to the extensive processing and high energy and time consumption required, in addition to the lack of manipulability of the resulting devices.

Overcoming such limitations of prior supercapacitor structures and fabrication procedures, the present invention provides, in particular, means for readily preparing flexible, low resistance supercapacitor structures under economical ambient conditions. These simple fabrication procedures, such as direct interelement lamination operations, enable the expanded use of these devices in a wide variety of configurations and applications, including combinations with integrated rechargeable battery energy sources of compatible composition and structure.

SUMMARY OF THE INVENTION

The supercapacitor structures of the present invention comprise as electrode elements an activated carbon fabric which has been discovered to have exceptional strength and durability, yet which provides the low electrical resistance and electrolyte-retentive porosity essential to supercapacitor cell functionality. Utilizing such a carbon fabric material, supercapacitor devices have been constructed which exhibit low internal resistance and are capable of yielding high energy and high current density over considerable time periods. Through the use of this material, supercapacitor devices may be conveniently fabricated by thermal lamination of the electrode elements with conductive current collector elements and high-porosity separator films to form flexible and exceptionally sturdy cell structures which may be readily activated with commonly-employed electrolyte compositions to yield their distinguishingly remarkable capacitive performance.

In a preferred process of constructing a supercapacitor cell, electrode elements of desired dimension are cut from a sheet of activated carbon fabric and are thermally laminated to respective electrically-conductive current collector foils, e.g., copper and aluminum reticulated grids, to form negative and positive capacitor electrode member subassemblies. The foils are preferably precoated with a minimal layer of electrically-conductive thermoadhesive composition to promote a low-resistance laminate interface in the electrode member.

A separator membrane of microporous thermoplastic composition, such as a high density polyethylene, is interposed between the carbon fabric surfaces of the electrode member subassemblies to form an assembly which is-then heated under pressure to thereby effect lamination of the cell elements into a unitary flexible supercapacitor structure. The laminated structure may thereafter be activated by immersion or other contact with an electrolyte solution, e.g., 1 M $LiPF_6$ in 2 parts ethylene carbonate and 1 part dimethyl carbonate, which fills the pores of the separator membrane, as well as of the carbon fabric electrode elements, to ensure essential ionic conductivity within the cell structure.

The advantageous simplicity in fabricating supercapacitor cells according to the present invention contributes greatly to its desirable utility. The capability of directly laminating the cell elements into a unitary flexible cell structure, for example, promotes the economy of time and resources, in addition to eliminating the superfluous weight of electrolytically nonfunctional structural components, such as composite binder or adhesive layers, and heavy compression elements or strengthening members. The invention thus provides a single, unitary high-capacity device comprising an economical and reliable source of both high energy and high power to meet the wide range of demands presented by modern electronic systems.

BRIEF DESCRIPTION OF THE DRAWING

The present invention will be described with reference to the accompanying drawing of which.

DESCRIPTION OF THE INVENTION

Figure 1:
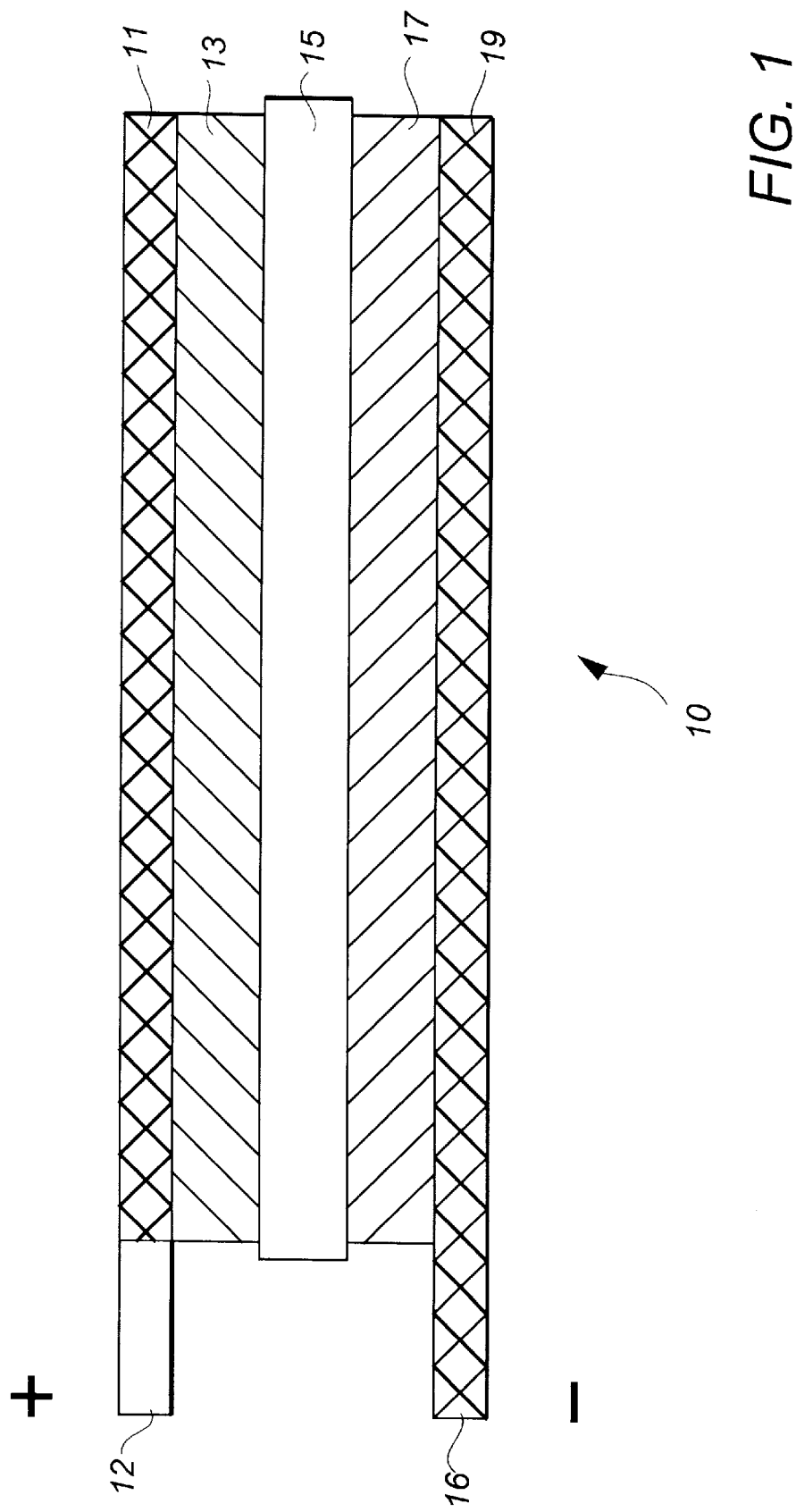
FIG 1 is a diagrammatic representation in cross-section of a laminated single supercapacitor cell structure of the present invention.

A laminated supercapacitor structure of the present invention as depicted in FIG. 1 includes a positive electrode member comprising a current collector foil 11, preferably in the form of an open mesh aluminum grid coated on at least its electrode interface surface with a minimal layer, not shown, of an electrically-conductive thermoadhesive composition, which is laminated under heat and pressure to electrode element 13 comprising activated carbon fabric. A negative electrode member similarly comprises a current collector foil 19, preferably in the form of a open mesh copper grid, which is likewise laminated to another activated carbon fabric electrode element 17. A separator member comprising a membrane 15 of ultra-high molecular weight micro-fibrillar polyolefin, viz., polyethylene, is interposed between carbon fabric electrodes 13, 17 of the composite electrode members, and heat and pressure are applied to soften the surfaces of the separator membrane and effect its firm bonding to the fabric electrodes. Extensions 12, 16 of the respective current collector foils conveniently provide connection terminals for the supercapacitor device.

Separator 15 is preferably selected from commercially-available microporous membrane materials marketed as Solupor by DSM Solutech of the Netherlands. In achieving the present invention it was surprisingly discovered that while this material is similar to other known electrochemical cell separator membranes, in that it exhibits a useful electrolyte-retentive and ion-transmissive porosity of up to about 85%, it does not suffer the deleterious pore-sealing collapse upon exposure to elevated temperatures which was observed in such earlier membrane materials. Apparently due to the micro-fibrillar structure and ultra-high molecular weight polyethylene composition of this membrane, it is advantageously capable of maintaining a useful level of porosity even after being heated to surface temperatures in its melting point range. This remarkable property enables the direct heat-lamination of the supercapacitor separator and electrode members which characterizes the present invention.

An additional unique characteristic of the invention is the activated carbon fabric employed as the electrode material of the supercapacitor cell. Commercially-available from Taiwan Carbon Technology Co., Ltd., of the Republic of China, as KoTHmex fabric, this material effectively combines light weight and high tensile strength with high electrolyte-retentive porosity and active surface area in the range of 1500 $m^2/g$, thereby enabling fabrication of rugged, self-supporting supercapacitor structures which do not necessitate reliance upon weighty support components. Unlike earlier supercapacitor structures which relied upon highly-compressive device arrangements to maintain the essential intimate contact between separator and respective electrode members and conductive current collector foil elements, the lamination of the present cell members alone ensures such intimacy and resulting low-resistance electrical continuity, yet provides ultimate supercapacitor cell integrity and flexibility. Other types of carbon fabrics, such as nonwoven webs or felts, may also be usefully employed.

Lamination of assembled supercapacitor cell structures may be accomplished with commonly-used apparatus. For example, preshaped or sized assemblies or sub-assemblies may be compressed between heated rollers or may simply be pressed for a short while between metal plates weighted at about $3 \times 10^4$ to $5 \times 10^4$ Pa in an oven at a temperature of about 120° to 160° C. or in a heated press providing similar conditions. Where continuous webs of component membranes are employed, the operation is preferably carried out using heated calender rollers.

The final operation in the supercapacitor cell fabrication process entails activation of the cell, which comprises the addition of an electrolyte in order to achieve ionic conductivity. This is preferably accomplished through application of an electrolyte solution to a packaged cell or by immersing the laminated cell structure, e.g., that of FIG. 1, in a solution of an electrolyte salt, such as $LiPF_6$. The microporous electrode and separator members provide an abundance of sites for retention of any of the non-aqueous electrolyte solutions commonly employed in supercapacitors. Notably, there may be employed in the electrolyte solution such organic solvents as propylene carbonate, diethoxyethane, diethyl carbonate, dimethoxyethane, sulfolane, and dipropyl carbonate and mixtures thereof. Also, in the formulation of the activating electrolyte solutions, further useful lithium and other salts, including $LiClO_4$, $LiN(CF_3SO_2)_2$, $LiBF_4$, $LiCF_3SO_3$, $LiSbF_6$, $NBu_4BF_4$, and $Et_4NBF_4$, may be employed in solution concentrations of between about 0.5 and 2 M. Of particular utility are the exceptional ethylene carbonate/dimethyl carbonate compositions of $LiPF_6$ and mixtures with $LiBF_4$ described in U.S. Pat. No. 5,192,629.

A number of laminated supercapacitor cells such as depicted in FIG. 1 were prepared and tested for electrical and physical suitability of use. The following examples are illustrative of such preparation and use.

EXAMPLE 1

A primer composition for the supercapacitor cell current collectors was prepared by ball-milling for about an hour a mixture of about 100 parts by weight of a 12% dispersion of a polyethylene:acrylic acid copolymer commercially available from Morton International as Adcote primer 50C12, 100 parts of ethyl alcohol, and 5 parts of battery-grade MMM Super C conductive carbon. The resulting suspension was thinned 1:1 with ethyl alcohol to obtain a viscosity appropriate for spray-coating, but any viscosity suitable for other coating operations would be acceptable.

EXAMPLE 2

An aluminum open mesh foil grid of about 50 $\mu$m thickness, e.g., a MicroGrid precision expanded foil marketed by Delker Corporation, was cut to form a positive current collector element 11 (FIG. 1) of about 50 mm×100 mm. One surface of the foil was spray-coated with the primer composition of Example 1 which was then air-dried to form an electrically-conductive thermoadhesive film a few $\mu$m thick. A copper foil grid was similarly formed and coated with the primer composition to provide a negative current collector element 19.

EXAMPLE 3

A 50 mm×80 mm section of TC-66 KoTHmex activated carbon fabric 13 was assembled in registered contact with the primer-coated surface of positive current collector grid 11 of Example 2, and this assemblage was passed between rollers of a commercial card laminator device heated to about 140° C. at a pressure of about 45 N per linear cm of roller contact. The lamination established a firm adhesive bond between grid 11 and fabric 13 to form a positive electrode member subassembly. Negative current collector element 19 was likewise laminated to a similar section of fabric 17 to form a negative electrode member subassembly.

EXAMPLE 4

A 55 mm×85 mm section of 14P01 grade Solupor membrane was taken to provide cell separator member 15 which was interposed between facing electrode carbon fabric elements 13, 17 so as to extend beyond the peripheries of the electrode elements and thereby ensure complete electrical insulation between them. Respective segments of the extending, non-adhered lengths of collector elements 11, 19 were then removed to provide offset collector terminal tabs 12, 16 (FIG. 1). Such tabs may, of course, be appropriately preformed during the initial trimming of the collector foil material. The assembled cell members were then passed through the card laminator at a temperature of about 135° C. to effect a firm adhesive bond at the interfaces of fabric electrode elements 13, 17 and separator membrane 15 to form the unitary supercapacitor cell 10. The noted precaution of oversizing the separator membrane may be dispensed with in more precise assembly operations, as when there is employed a continuous process in which the cutting of cells to desired dimension is effected after lamination operations are completed.

Laminated cell structure 10 was thereafter activated in a moisture-free atmosphere by immersion in a 1 M electrolyte solution of $LiPF_6$ in a 2:1 mixture of ethylene carbonate (EC):dimethyl carbonate (DMC) for about 1 hour during which it imbibed the electrolyte solution into the microporous laminate structure. Following a mild wiping with absorbent material to remove surface electrolyte, the activated supercapacitor cell 10 was hermetically sealed, but for the extending terminal tabs 12, 16, within a polyolefin envelope (not shown) to maintain a moisture-free environment.

EXAMPLE 5

Figure 2:
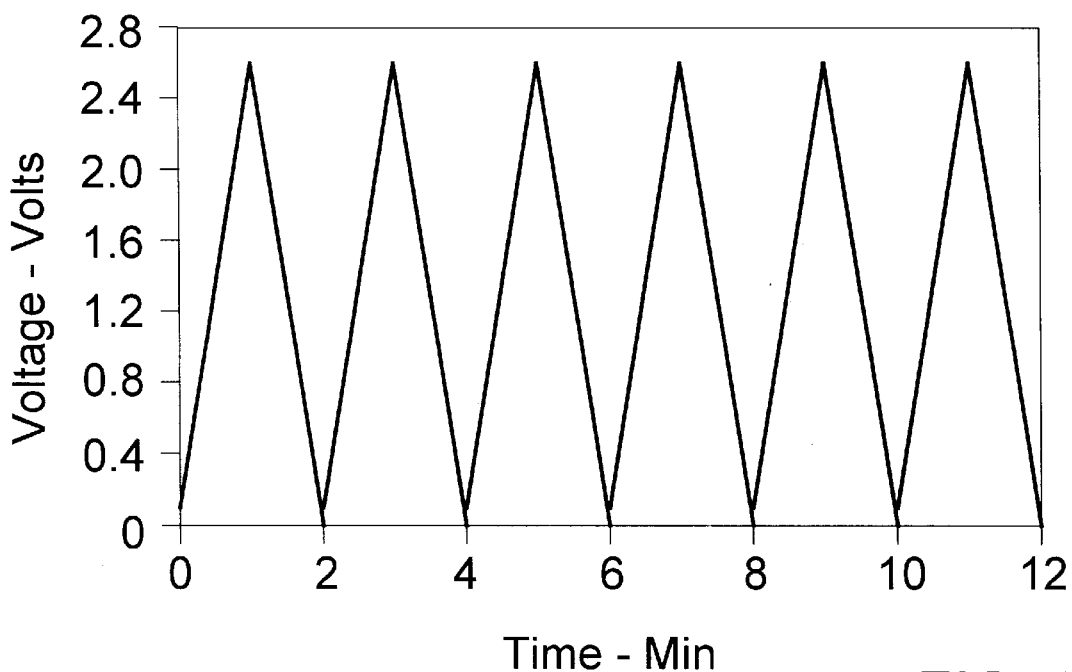
FIG. 2 is a graphical representation of the charge/discharge characteristics of a supercapacitor of the present invention.
Figure 3:
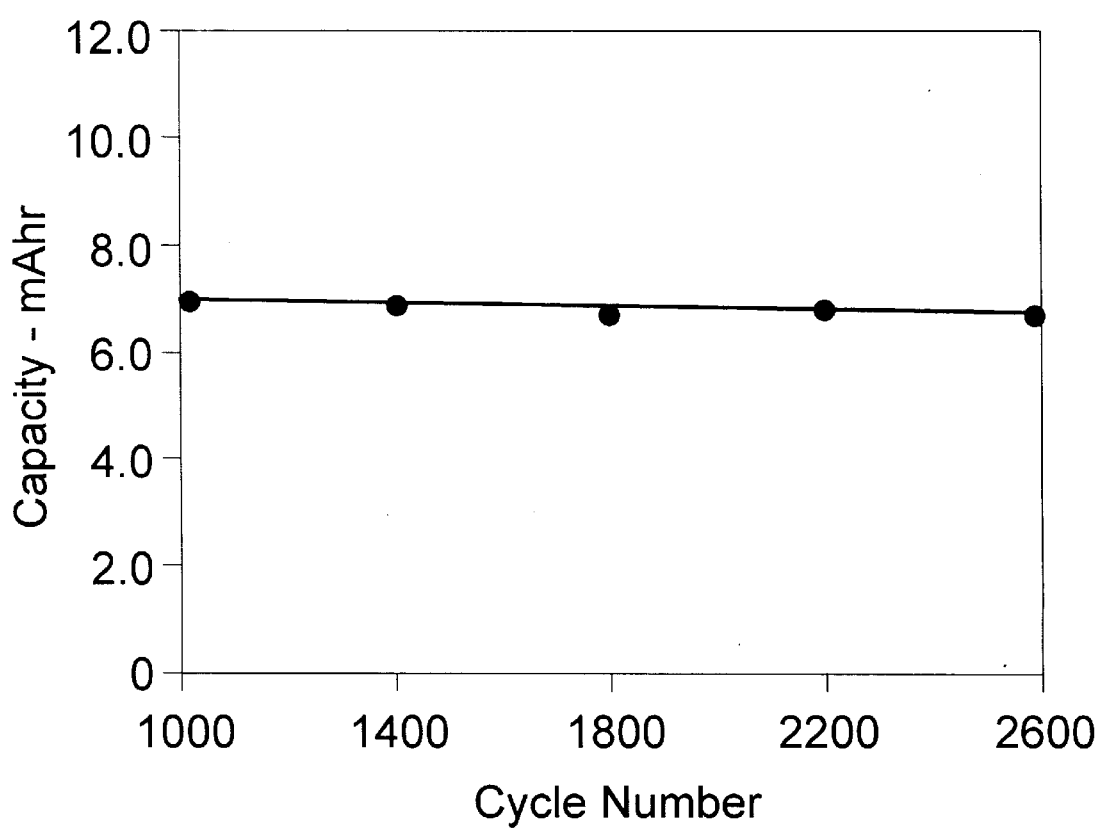
FIG. 3 is a graphical representation of the cycling stability of a supercapacitor of the present invention.

The supercapacitor cell of Example 4 exhibited a capacitance of about 10.8 F when subjected to repeated charge/discharge cycling of 2 min periods at 0.1 A in the range of 0–2.0 V and of about 15.0 F in the range of 0–2.75 V. The cell exhibited the cycling characteristics represented in FIG. 2, while the capacity of the supercapacitor after extended cycling remained steady at about 7.2 mAhr as shown in FIG. 3.

It is expected that variants in the structure and fabrication of the supercapacitors disclosed in the foregoing description will occur to the skilled artisan through the exercise of ordinary aptitude, and such variants are nonetheless intended to be included within the scope of the present invention as set out in the appended claims.

What is claimed is:

1. A supercapacitor structure comprising in contiguity a positive electrode member, a negative electrode member, and a separator member disposed therebetween, wherein
    a) said positive electrode member comprises an activated carbon fabric element and an electrically conductive current collector element bonded to said positive electrode member membrane,
    b) said negative electrode member comprises an activated carbon fabric element and an electrically conductive current collector element bonded to said negative electrode member membrane,
    c) said separator member comprises a micro-fibrillar ultra-high molecular weight polyolefin membrane, and
    d) said positive electrode member and said negative electrode member are bonded to opposite interface surfaces of said separator member to form a unitary flexible laminate structure.

2. A supercapacitor structure according to claim 1 wherein said polyolefin membrane comprises polyethylene.

3. A supercapacitor structure according to claim 1 wherein at least one of said collector elements comprises an open-mesh grid.

4. A supercapacitor structure according to claim 1 wherein said collector elements are thermally bonded to respective electrode elements by an electrically-conducting thermoadhesive composition.

5. A supercapacitor structure according to claim 1 wherein said positive electrode member and said negative electrode member are thermally bonded to the interposed separator member by virtue of the thermoadhesive properties of said polyolefin membrane.

\* \* \* \* \*